United States Patent
LeBlang

(10) Patent No.: US 8,011,783 B1
(45) Date of Patent: Sep. 6, 2011

(54) HEARING DEVICE CONNECTOR FOR EYE GLASSES

(76) Inventor: Dennis William LeBlang, Palm Desert, CA (US)

( * ) Notice: Subject to any disclaimer, the term of this patent is extended or adjusted under 35 U.S.C. 154(b) by 0 days.

(21) Appl. No.: 12/661,789

(22) Filed: Mar. 23, 2010

(51) Int. Cl.
*G02C 1/00* (2006.01)

(52) U.S. Cl. .......................................... 351/158; 381/381

(58) Field of Classification Search .................. 351/158, 351/156, 157, 41, 123, 122, 121, 111; 381/381, 381/380, 327, 322, 330; 128/864, 866; 181/130, 181/134, 135; D24/67; 24/3.3
See application file for complete search history.

(56) References Cited

U.S. PATENT DOCUMENTS

| | | | | |
|---|---|---|---|---|
| 3,979,795 A | * | 9/1976 | Seron | 24/3.3 |
| 5,327,178 A | * | 7/1994 | McManigal | 351/158 |
| 5,335,285 A | * | 8/1994 | Gluz | 381/381 |
| 5,414,907 A | * | 5/1995 | Kiapos | 24/3.3 |
| 5,465,466 A | * | 11/1995 | Napier | 24/3.3 |
| D370,023 S | * | 5/1996 | Torrey | D16/339 |
| 5,940,938 A | * | 8/1999 | Davancens et al. | 24/3.3 |
| 5,974,632 A | * | 11/1999 | Chang | 24/3.3 |
| 2006/0153415 A1 | * | 7/2006 | Weyer | 381/381 |

FOREIGN PATENT DOCUMENTS

DE  202004004086  *  7/2004

* cited by examiner

*Primary Examiner* — Hung X Dang

(57) ABSTRACT

The hearing device connector for eyeglasses is a connector that attaches a hearing aid device or a hearing device ear hanger to eyeglasses. The hearing aid device can have a flexible elastic sound tube from the transmitter and the sound tube passes through the connector and the stem of the eyeglasses securing the hearing aid directly to the eye glasses. Other types of hearing devices like telephone or radio sound tube can also be attached to the connector and eyeglasses. Eyeglass holders or attachments that fit around a person's head can also be used to fasten the connector to hearing aids.

3 Claims, 7 Drawing Sheets

HEARING DEVICE CONNECTOR FOR EYE GLASSES

THE FIELD OF THE INVENTION

The present invention relates to attaching a connector to a hearing aid or other ear communication devices on to the eyeglass stems of a person's eye glasses.

BACKGROUND OF THE INVENTION

Traditionally eye glasses are manufactured consisting of an eye glass frame that supports or attaches two lenses to the eye glass frames. The eye glass frames are formed to fit around the lenses and the nose. The eye glass stems attach to the eye glass frames and are curved to fit over the left and right ear on a person's head. Eye glasses come in various sizes and different weights and are a fashionable as well as a functional item. Since eye glasses main function is to improve a person's eyesight, the glasses need to be comfortable and fit correctly on a person's head.

Hearing aids were developed to improve a person's hearing and come in a variety of shapes and forms. A hearing aid can be formed so the hearing aid controls fits directly into the ear drum and is secured by the outer ear firmly securing the hearing aid into the ear. Another form of a hearing aid is attached to an ear hanger and the hearing aid mechanism. Here the hearing aid mechanism is located outside the inner ear and a rigid ear hanger extends from the hearing aid around the ear to firmly hold the hearing aid mechanism in place. The rigid ear hangers come in a variety of sizes and shapes to conform to a person's ear. Another form of hearing aid is when the volume control and the hearing mechanism are located the behind the ear. This type of hearing aid has a hollow flexible tube that carries the sound from the hearing aid mechanism to an ear cushion. The ear cushion is secured into to the ear to hold the hearing aid in place. The flexible tube type hearing aid is designed so the flexible tube fits around the top of a person's ear so that the flexible tube acts an ear hanger holding the hearing aid in place.

Other types of hearing devices are presently being used to allow a person to hear various types of sound transmissions directly into their ear without having to hold the mechanism to their ear. For example, radios and CD players have flexible cords that extend from the transmitters to the ear cushions at the end of the flexible cords. Other types of sound transmission devices have microphones attached to a head band. The microphones are receivers and transmit the sound directly to the ear. In addition, Bluetooth devices receive a telephone call directly from a portable telephone and transmit the telephone call to a receiver that typically has an ear hook attached to the receiver.

There have been several attempts to install a hearing device directly onto eye glasses allowing the eye glasses to support the hearing device. One attempt was to mount the hearing device and receivers directly into the frame of the eye glasses making the eye glasses and hearing devices with transmitter all as one unit. Other units have specially designed connections transmitters or hearing devices that attach directly to the eye glass stems.

There are various types of securing devices that have been installed on eye glasses over the years. Howard in U.S. Pat. No. 7,192,136 & U.S. Pat. No. 7,438,410 has a connector that attaches the eye glasses to the eye glass stem which is then tethered to a cord that fits behind a person's neck to prevent the eye glasses from falling off ones face. In addition components have been installed within the eye glasses to transmit sound. In Davancens, U.S. Pat. No. 5,655,264, Fuller, U.S. Pat. No. 4,133,604 and Mackay U.S. Pat. No. 6,941,619 all have securing devices that are installed on the eye glass, but only to secure the eye glasses to a cord for preventing the lost of the eye glasses.

In U.S. Pat. No. 6,233,345 Urwyler has an earphone assembly that comprises a flexible cord from the eye glasses with a microphone extending to the ear and earphone wires extending to a transmitter. The flexible cord has slits that slide into the eye glass stems of the eye glasses. In U.S. Pat. No. 7,409,234 by Glezerman uses a mounting mechanism that is attached to eye glasses along with the transmitter. An ear hanger can also be interchanged with the mounting mechanism to attach the transmitter to the ear should a person not be wearing eye glasses. In U.S. Pat. No. 7,461,936 by Jannard uses a coupling that wraps around the eyeglass stem to secure the transmitter to the eye glasses. The coupling has a clasp type mechanism that closes over the eyeglass stem securing the transmitter to the eye glasses. In U.S. Pat. No. 5,927,659 by Lang has an ear hook that fits over the ear and supports a flexible cable that hangs below a hearing device.

In U.S. Pat. No. 7,079,876 by Levy, U.S. Pat. No. 7,013,009 by Warren and U.S. Pat. No. 7,458,682 by Lee have the microphone, transmitter, speaker, receiver and power source all mounted within the frame of the eye glasses and or eyeglass stems. The one piece eye glass construction does not allow for the eye glasses to be used for other functions.

There are many different types of hearing devices on the market today. Wireless headsets like U.S. Pat. No. 7,356,156 by Ruegg have just load speakers attached to the ear with no ear hangers. Wireless earphones like U.S. Pat. No. 7,231,056 by Chen or U.S. Pat. No. 7,106,877 by Linville are earphones with a speaker attached and have an ear hanger attached to the earphone. Headphones with head straps like U.S. Pat. No. 6,449,806 by Engelhard have headphones attached to a head band connecting the two headphones at each ear. In U.S. Pat. No. 6,621,905 by Chun has a earphone support comprising a pair of curved ear contact supports for speakers or microphones that have no other means of support. A flexible hearing aid like U.S. Pat. No. 7,027,608 by Fretz uses the sound transmission tube as an ear hanger. Some solid hearing aids come in the shape of an ear hanger like U.S. Pat. No. 6,625,290 by Dittli.

There are many different types of eye glass holders that have connectors attached to the eyeglass stems, however all of these connectors have some type of strap that fits tight on the head or loose around the neck securing the eye glasses to the connector. The purpose of all these connectors is to have a strap or chain hold the eye glasses around a person's head or neck and to keep the eye glasses from getting lost or misplaced. None of these connectors for the eye glass holders we patented to hold a hearing device in place on the eye glasses.

In U.S. Pat. No. 3,979,795 & U.S. Pat. No. 4,136,934 by Seron have a flexible clasp that fits onto the eyeglass stem with a slider ring to adjust the grip on the glasses and a clasp to attach a beaded chain. Seron second patent is similar with a different connection for attaching a head strap. In U.S. Pat. No. 5,414,907 by Kiapos the eye glass retainer coupling was a stretchable plastic closed look with a spring and a coupling to install a beaded chain. In Napier U.S. Pat. No. 5,465,466 the fashion frame chain holder has a plastic cord, a bead that fits around the plastic cord to a crimp end that holds a flexible necklace. Another end fastener for eyeglass holders is U.S. Pat. No. 5,940,938 by Davancens uses an elongated elastomeric body having a double-tapered slot for installing the eyeglass stems plus a hole and a connecting ring, eyelets, cord end caps and a cord connecting the two end fasteners. In U.S.

Pat. No. 5,974,632 by Chang the eyeglass fastening device uses rubber ring that attach to the eyeglass stems plus connecting piece, extension fingers and decorative connection for fastening belt around a person's head.

Another type of holding device in US D370,023 by Torrey has a medallion with a clasp that is attached to eye glasses and a cord attached to the clasp to keep the eye glasses around a person's neck.

SUMMARY OF THE INVENTION

The invention relates to connecting a hearing device or hearing device ear hanger to eye glasses. The hearing device connector is a flexible elastic connector that fits around an eyeglass stem. The flexible elastic connector has a hole in the middle of the connector that allows the eyeglass stem to pass through as well as an ear hanger that extends from the hearing device and loops around the ear. The eye glass stem and the nose indentation of the glass frame secure the eye glasses to the head and a hearing device hanger secures a hearing device to the top of the ear. The hearing device connector attaches the eye glass stem to a hearing device hanger together forming a flexible connection between the eye glass stem and the hearing device. The hearing device connector can be adjusted anywhere along the eye glass stem or anywhere along the hearing device hanger, allowing a person to have a comfortable fit between the hearing aid device and the eye glass stem.

Once the hearing aid devise is attached to the eye glass stem, the hearing aid devise and eye glass become one unit. If the eye glasses were removed, the hearing aid devise would also be removed at the same time. Conversely, once the eye glasses and hearing aid devise have been removed, the two can be installed together without any disassembling.

Should the hearing aid devise be a hearing aid, they often require cleaning as do the glass lenses of eye glasses. The hearing aids hooks or hangers can be removed from the connector allowing for easy maintenance of either the eye glasses or the hearing devices.

Since there are many different hearing aids and not all hearing aids have a rigid hook, but are manufactured with hollows tubes that transmit the sound through the hollow tubes. These hollow tubes act as the hearing aid hook. These hollow tubes can be inserted into the hole in the connector again connecting the hearing aid to the eye glass stems.

Another method to attach a hearing device is to use the connectors of eye glass holders. Eye glass holders have two connectors one attached to each eyeglass stem of a person's eye glasses. Each of the connectors has a method to attach a cord that wraps around a person's head to keep one from losing their eye glasses. These connectors for the eye glass holders usually fit behind the ear or become more decorative and are installed in front of the ear. Eye glass holders are never installed above the ear because they are too bulky and would irritate a person's ear. On the other hand, some of the drawings show a hearing device attached to the connectors of the eye glass holders.

BRIEF DESCRIPTION OF DRAWINGS

FIG. 10 shows the prior art of an eye glass holder using flexible clasps and slider rings to adjust the connector to the eyeglass stem using the clasp as a connector.

FIG. 11 shows the prior art of an eye glass holder using a flexible strap and a holding fixture with a hole where the eyeglass stem is inserted through.

Previously cancelled

Figure 16:
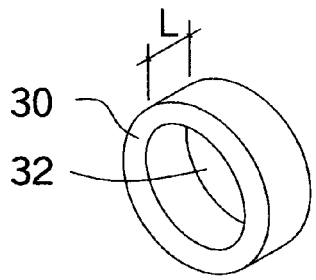

FIG. 16 shows an enlarged view where the connector is a tubular shape.

Figure 17:
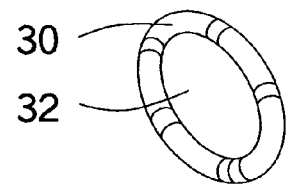

FIG. 17 shows an enlarged view where the connector is round and curved at the edges.

DESCRIPTION OF PREFERRED EMBODIMENTS

Figure 1:
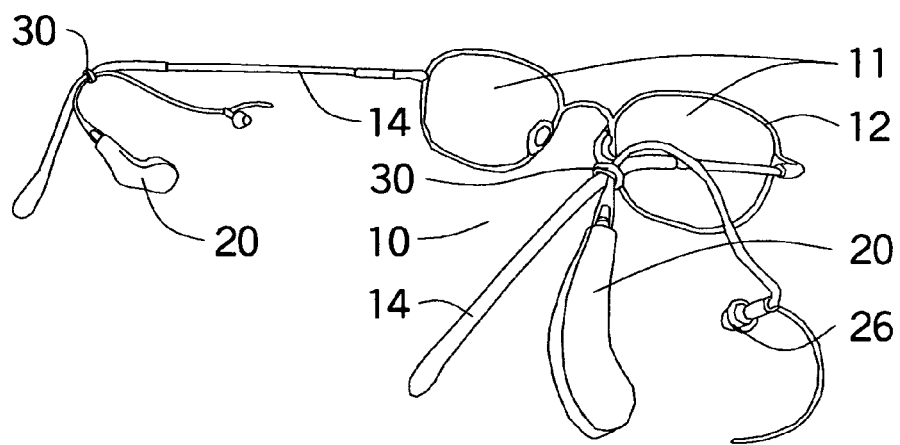
FIG. 1 is an isometric view of a hearing aid device attached to the stem of a pair of eye glasses of a user.
Figure 2:
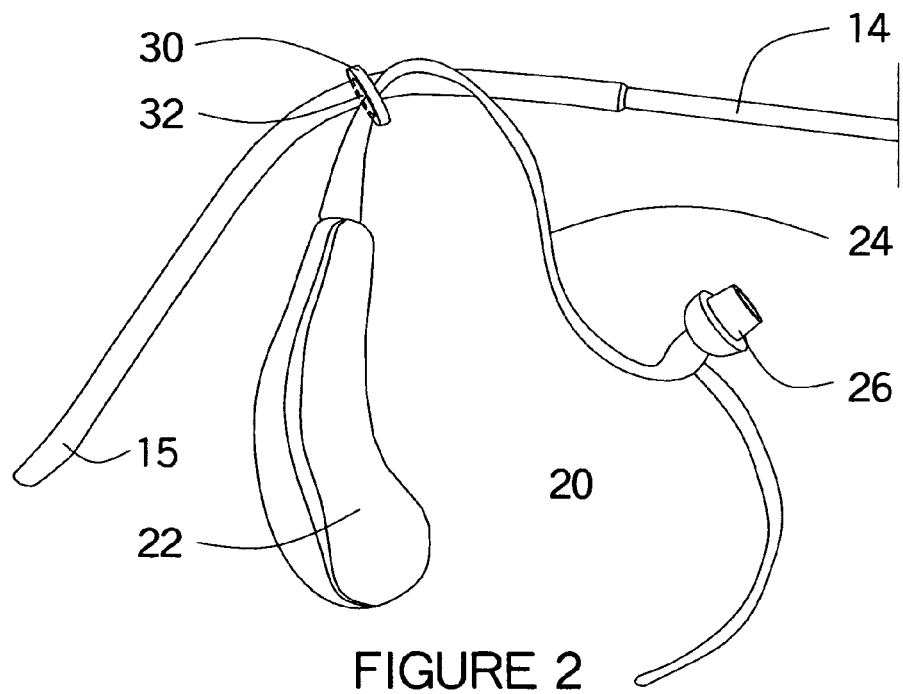
FIG. 2 is an enlarged view of the hearing aid device attached to the stem of a pair of eye glasses.
Figure 3:
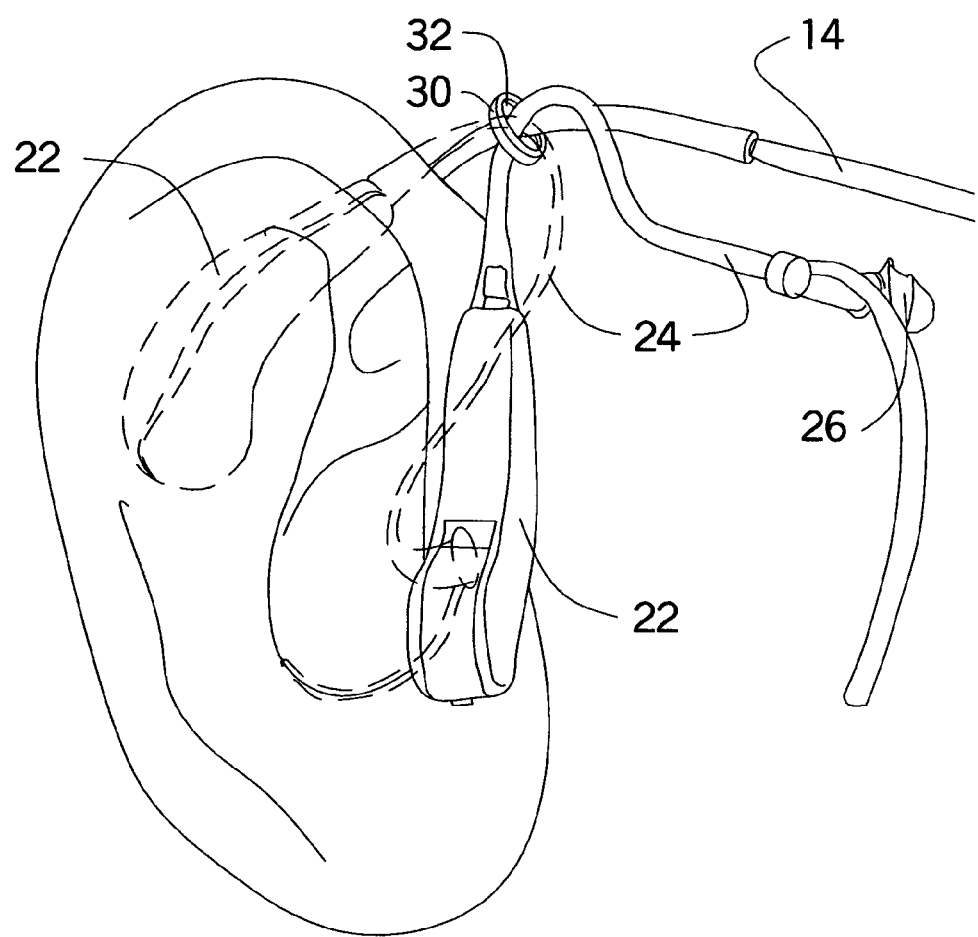
FIG. 3 shows the connector attached to the eyeglass stem and the sound tube of the hearing aid device as well as the housing located behind and ear and the eartip located in a person's ear canal.

Referring to FIG. 1, a pair of eyeglasses illustrated generally at 10 as shown has lenses 11, 11, a main frame 12 for the lenses, and eyeglass stems 14 that are generally hinged to the main frame 12 in a normal manner. Also shown is a hearing aid 20 which has a housing 22 designed to be positioned behind the ear of the user, a sound tube 24 for transmitting sound from the hearing aid device 20 to the ear canal of the user, and an eartip 26 for anchoring the end of the sound tube 24 within the ear canal of the user. FIG. 2 is an enlargement of the hearing aid 20 attached to the eyeglass stems 14 by a connector 30. FIG. 3 shows the ear and how the hearing aid device 20 is secured by the connector 30 to the eyeglass stem 14. The hearing aid device 20 is shown in phantom in FIG. 3 when the housing 22 is positioned behind the ear and the eartip 26 is located in the ear canal of the user. This type of flexible hearing aid 20 is designed so the housing 22 rests on the back of the ear and the flexible hollow sound tube 24 passes over the top of a person's ear and continues to the eartip 26 located at the ear canal exerting pressure on the ear to firmly hold it in place. The flexible sound tube 24 and the weight of the housing 22 firmly holds the flexible hearing aid device 20 in place. This type of flexible aids devices like 20 are designed so the housing 22 that can be removed and the connector 30 has a hole 32 in the middle of the connector 30 so the flexible sound tube 24 can pass through the hole 32 of the connector 30. The hole 32 in the connector is not required to fit tight to the eyeglass stem 14 so as to allow the sound tube 24 of the hearing aid device 20 to remain in place while the eyeglasses 20 are move on a person's head. The connector 30 is an elastomeric material and is flexible to stretch and fit over the temple leg 15 of the eyeglass stem 14 securing the hearing aid onto the eyeglasses 10. The hearing aid 20 can be slide into position as shown in FIG. 3 so the housing 20 can be positioned behind the ear and the sound tube 22 can be slid into any position so the sound tube 22 cushion is in place at the ear canal for the most comfortable position at the ear.

Figure 4:
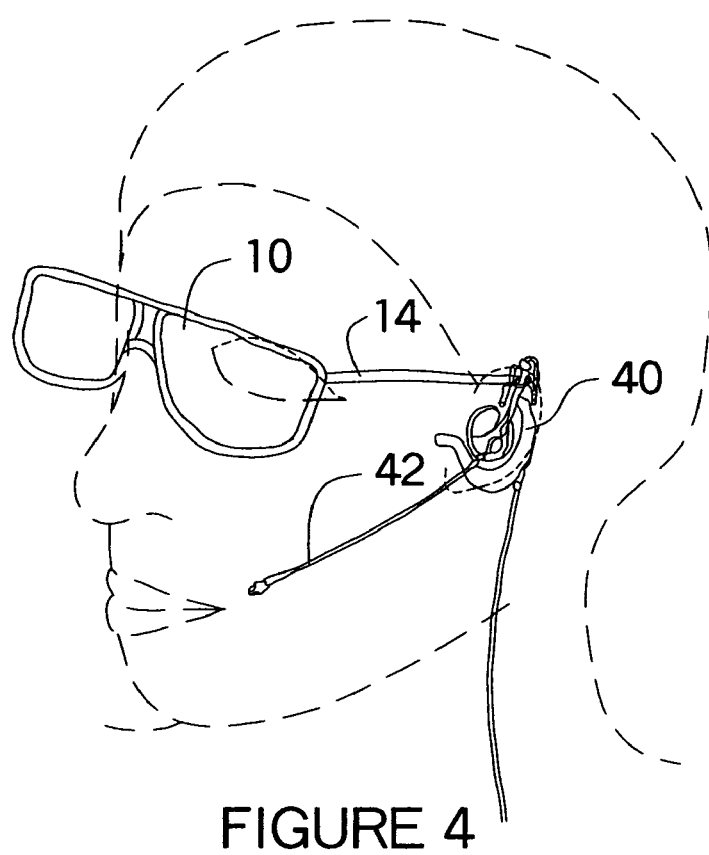
FIG. 4 shows an adjustable ear-hook earphone and microphone attached by the connector to the eyeglass stems of the eye glasses.
Figure 5:
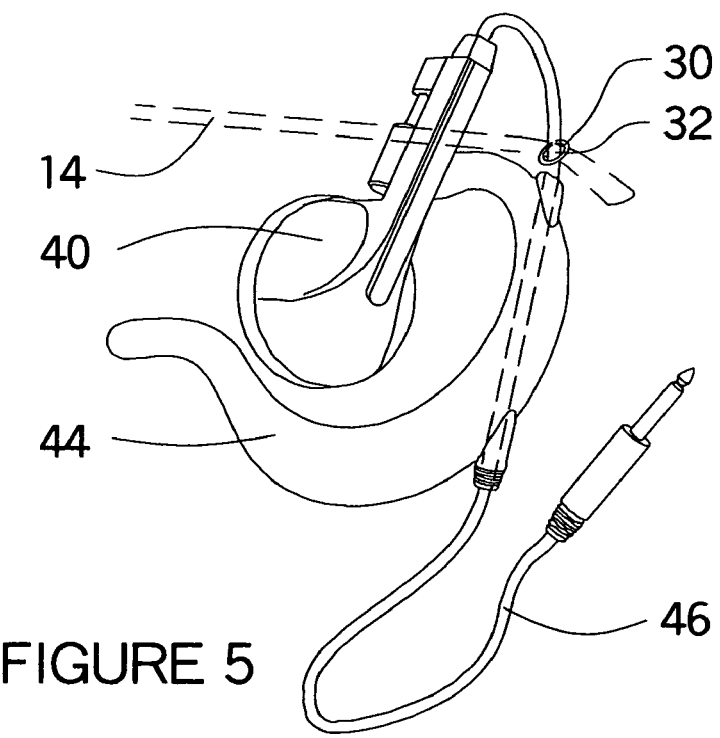
FIG. 5 shows an enlarged view of the adjustable ear-hook earphone attached by the connector to the eyeglass stems of the eye glasses.

FIG. 4 shows and adjustable ear-hook earphone 40 with a microphone 42 attached. There are several ways this type of earphone 40 can be connected to the eyeglasses 10. FIG. 4 shows the earphone with a microphone 42 and FIG. 5 is an enlarged drawing of the earphone 40 without the microphone 42 attachment. This type of earphone 40 has an ear hook 44 and a wire 46 that transmits the sound to the earphone 40. One method to install the earphone 40 to the eyeglass stem 14 is to first install the ear hook 44 through the hole 32 of the connector 30, then place the eye glass stem into through the hole 32 of the connector 30. The connector 30 is now attached the earphone 40 to the eyeglass stem 14 of the eye glasses 10. Another option to connect the earphone 40 to the eyeglass 10, is to disconnect the adaptor 41 for the earphone 40 and insert the adaptor 41 through the hole 32 of the connector 30. Attach the connector 30 on to the eyeglass stem 14 securing the earphone 40 to the eyeglasses 10.

Figure 6:
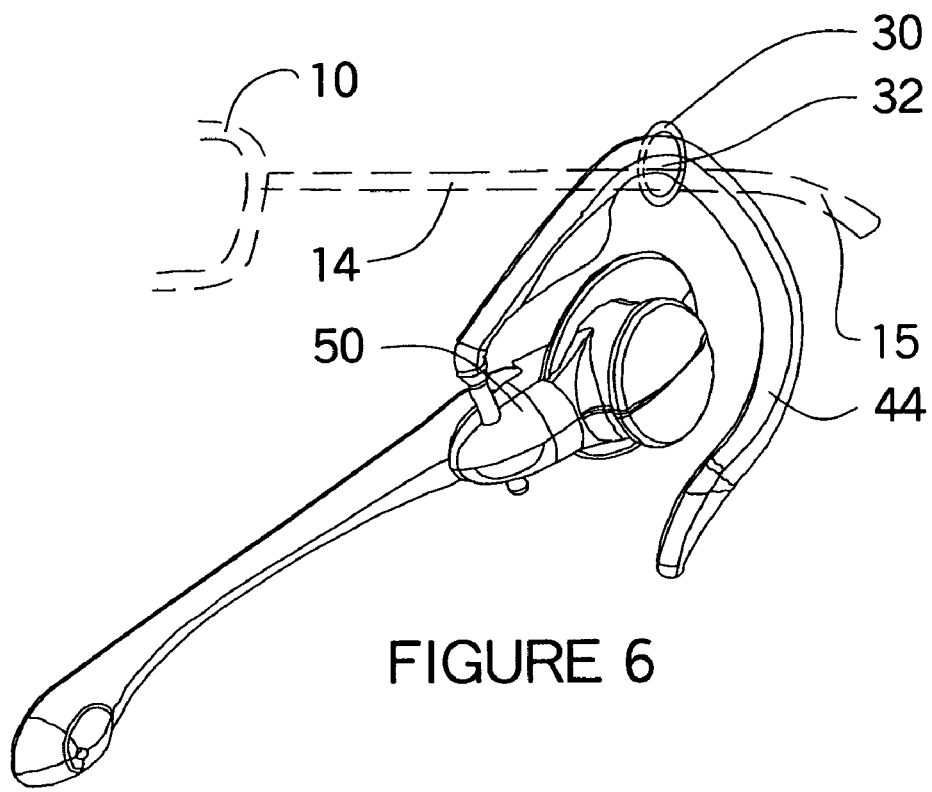
FIG. 6 shows a headset with an ear hook and a speaker device where the connector is attached to an ear hook and the stem of the eyeglasses.

FIG. 6 shows another type of headset 50 where the ear hook 44 extends above the ear from the headset 50 and fits over the ear. To attached the headset 50 to the eyeglasses 10 is to pass the end of the ear hook 40 through the hole 32 of the connector 30, then pass the eyeglass stem 14 through the hole 32 of the connector 30. Both the hear hook 44 and the eyeglass stem 14 are connected to the connector 30 through the hole 32 of the connector 30. Since the connector 30 is an elastomeric material and is flexible to stretch the connector 30 can easily fit over the temple leg 15 of the eyeglass stem 14 securing the headset 50 onto the eyeglasses 10 (not shown).

Figure 7:
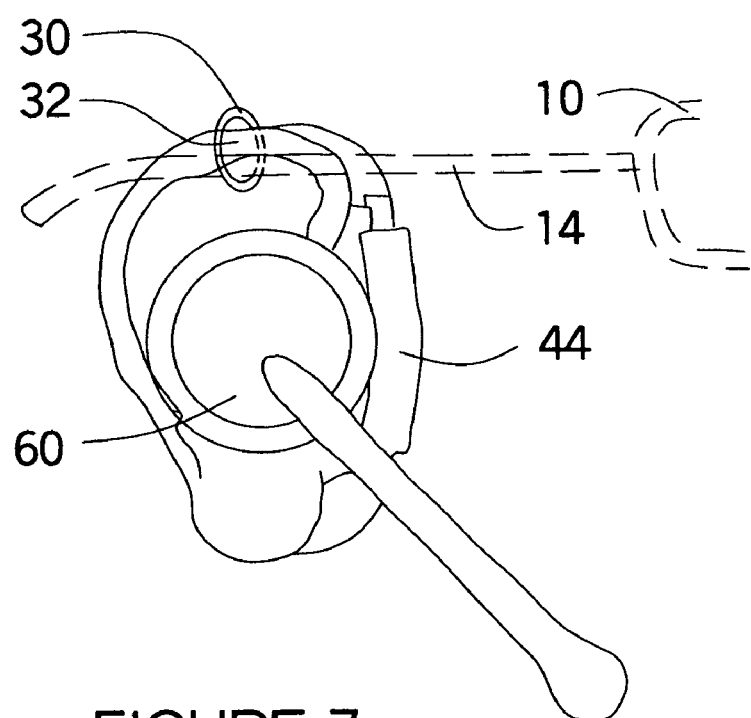
FIG. 7 shows an earphone/microphone with an adjustable ear hook with a connector attached to the adjustable ear hook and the stem of the eyeglasses.

FIG. 7 shows an adjustable ear hook 44 that encases an earphone/microphone 60. The top of the adjustable ear hook 44 passes through the hole 32 of the connector 30. The connector 30 is then attached to the eyeglass stem 14 of the eyeglasses 10 connecting the adjustable ear hook 44 to the earphone/microphone 60.

Figure 8:
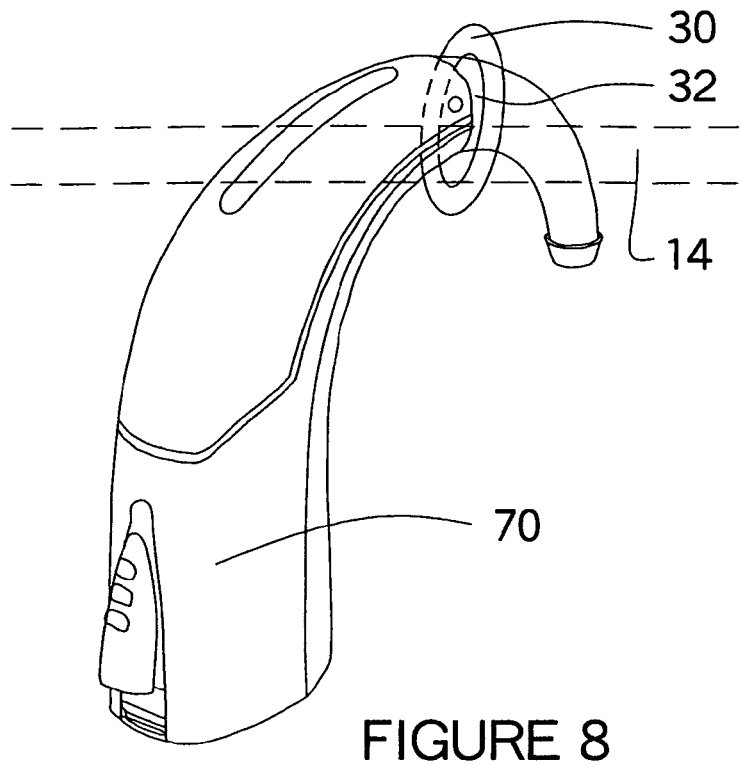
FIG. 8 shows a headset in the shape of an ear hook that is attached with a connector to the eyeglass stem.
Figure 9:
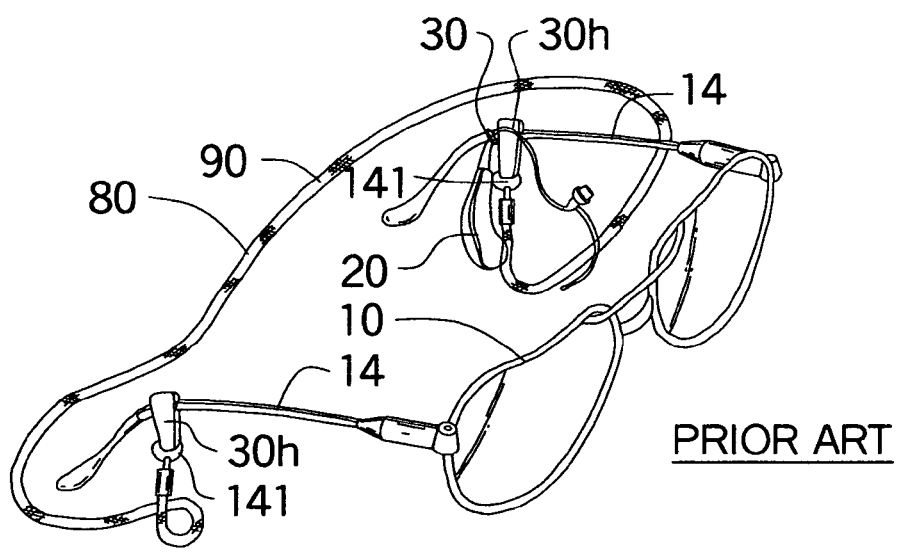
FIG. 9 shows the prior art of eye glass holders with a hearing aid device attached to the eyeglass stems and a tethered cord that fits around a person's neck to prevent loss of their eye glasses.

FIG. 8 shows a headset 70 where the headset 70 is similar in shape to the ear hook 44 that fits over the ear as shown in FIG. 6. Since the headset 70 is narrow at the end, a larger hole 32 is required for the connector 30. Since the design of the headset 70, the connector 30 has to be located at the highest arc of the headset 70 in order to keep the headset 70 secure to the eyeglass stem 14.

FIG. 9 through FIG. 15 shows various types of eye glass holders 80 that attach to the eyeglass stems 14 by a tethered cord 90 that fits around a person's neck or secured to one's head. In all cases, there are two connectors 30h, one end of each connector 30h is attached to the tethered cord 90 and the opposite end of the two connectors 30h attaches directly or indirectly to the eyeglass stems 14. There are two different types of connectors 30h, one type allows for the tethered cord 90 to be removed from the connector 30h, while others require the tethered cord 90 to be always attached to the connectors 30h. All the connectors 30h have a hole 32h to allow for any of the hearing aids 30, 40, 50, 60 or 70 to pass through the hole 32h thereby connecting the hearing aids to the eyeglass stems 14.

Figures 10, 11:
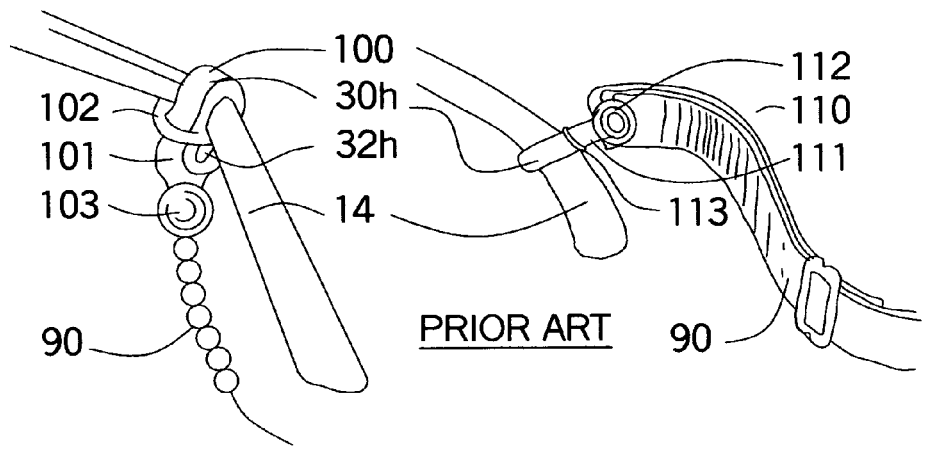

FIG. 10 eye glass holder 100 from U.S. Pat. No. 3,979,795 by Seron uses flexible clasps 101 and slider rings 102 to adjust the hole 32h to the eyeglass stem 14. The flexible clasps 101 have an extension 103 that holds the tethered cord 90 onto the flexible clasps 101. The flexible clasps 101 can be used without the tethered cord 90 and a hearing devices can be inserted into the hole 32h; however the elongated shape would be visible as well as uncomfortable on a person's ear. No hearing device is inserted through the hole 32h of the connector 30h and the connector 30h is not intended to be used to support a hearing device.

FIG. 11 eye glass holder 110 from U.S. Pat. No. 4,136,934 by Seron uses a flexible strap or cord 90 and a holding fixture 111 with a hole 32h within the holding fixture 111 where the eyeglass stem 14 is inserted through. A disc like portion 112 projects from the holding fixture 111 that attaches to the cord 90. A wire band 113 wraps around the holding fixture 111 to secure the holding fixture 111 to the eyeglass stem 14. The holding fixture 111 can be used without the cord 90 and a hearing device can be inserted into the hole 32h, however again the elongated shape of the holding fixture 111 would be visible as well as uncomfortable on a person's ear. No hearing device is inserted through the hole 32h of the connector 30h and the connector 30h is not intended to be used to support a hearing device.

Figures 12, 13:
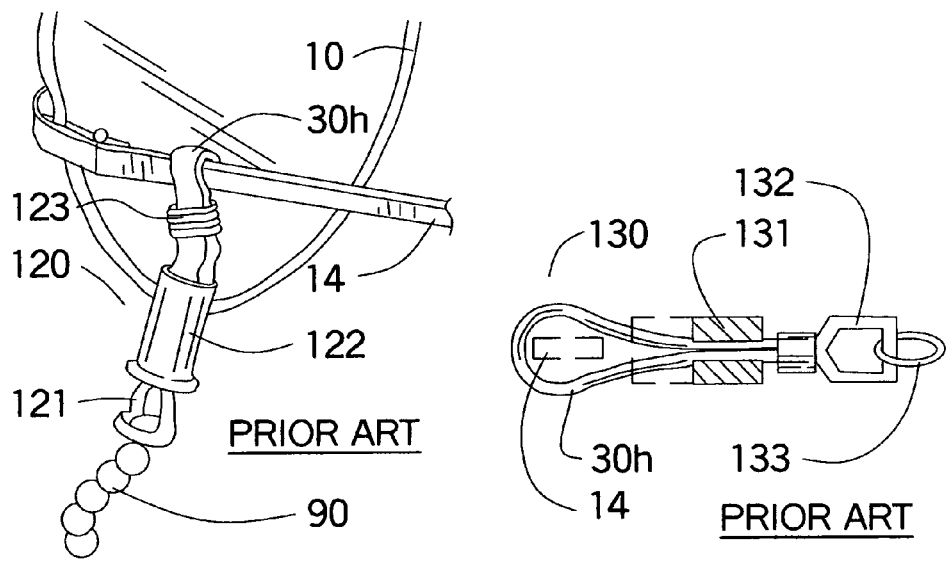
FIG. 12 shows the prior art of an eye glass holder formed by a plastic loop that extends into a coupling that holds the connector to the coupling and a tubular sleeve that fits over the coupling plus a helical spring securing the connector to the eyeglass stem.
FIG. 13 shows the prior art of an eye glass holder formed by a plastic cord that is looped over the eyeglass stems so the ends of the connector fit through a bead and connected to a fastener.

FIG. 12 eye glass holder 120 from U.S. Pat. No. 5,414,907 by Kiapos is formed by a plastic loop or connector 30h that extends into a coupling 121 that holds the connector 30h to the coupling 121 and a tubular sleeve 122 fits over the coupling 121 securing the connector 30h. The connector 30h is installed on the eyeglass stem 14 and a helical spring 123 fits over the connector 30h and is used to adjust the connector 30h to the eyeglass stem 14. A chain or cord 90 is installed at the bottom of each coupling 121. The connector 30h is reduced in size by using the coupling 121 and the helical spring 123. The intent of the Kiapos patent is to support the eye glasses 10 around a person's neck with the cord 90. No hearing device is inserted through the hole 32h of the connector 30h and the connector 30h is not intended to be used to support a hearing device.

FIG. 13 the eye glass holder 130 from U.S. Pat. No. 5,465,466 by Napier is formed by a plastic cord or connector 30h that is looped over the eyeglass stems 14 so the ends of the connector 30h fit through a bead 131 and connected to a fastener 132. The opposite end of the fastener 132 has a ring 133 that connects to the cord 90. The bead 131 is adjustable allowing the connector 30h to be connected to the eyeglass stem 14. The intent of the Napier patent is to support the eye glasses 10 around a person's neck with the cord 90. No hearing device is inserted through the hole 32h of the connector 30h and the connector 30h is not intended to be used to support a hearing device.

Figure 14:
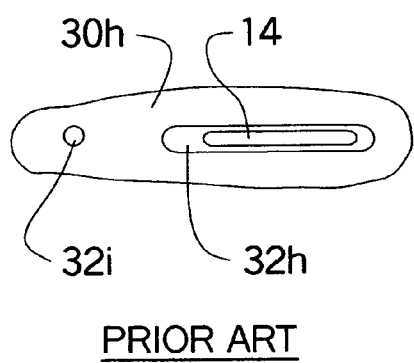
FIG. 14 shows the prior art of an enlargement of an eye glass holder in FIG. 10 which is formed by end fasteners that fit into the eyeglass stems and another hole that connects to a ring connecting the cord.

FIG. 10 shows the eye glass holder 80 in U.S. Pat. No. 5,940,938 by Davancens is formed by end fasteners or connectors 30h that have holes 32h that fit into the eyeglass stems 14. In FIG. 14 the connector 30h has another hole 32i that where a ring 103 (shown in FIG. 10) fits through to connect the connector 30h to the cord 90. Various holes 32h are shown in the connectors 30h in order to form a tight fight to the eyeglass stems 14 to insure the eye glass holder 80 stays secure to the eye glasses 10. The intent of the Davancens patent is to support the eye glasses 10 around a person's neck with the cord 90. No hearing device is inserted through the hole 32h of the connector 30h and the connector 30h is not intended to be used to support a hearing device, however the sound tube (not shown) of a hearing device can be inserted through the holes 32h.

Figure 15:
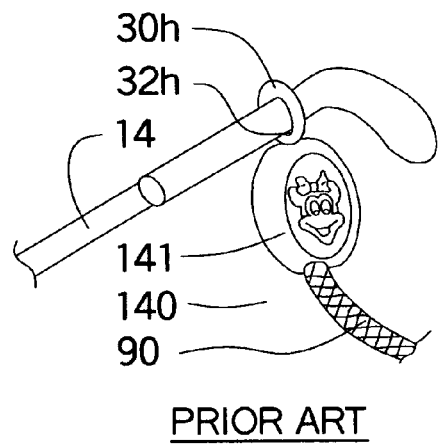
FIG. 15 shows the prior art of an eye glass holder formed by two rubber rings which attaches to some connecting pieces that are slid into the decorative attachments and connected to the cord.

FIG. 15 shows the eye glass holder 140 from U.S. Pat. No. 5,974,632 by Chang is formed by two rubber rings or connectors 30h which attaches to some connecting pieces (not shown) that are slid into the decorative attachments 141 and connected to the cord 90. The connector 30h has a hole 32h into which the eyeglass stem 14 can pass through. The connecting pieces (not shown) loop the connector 30h into the decorative attachment 141 securing the eye glass holder 140 to the eyeglass stem 14. The connector 30h is loose and requires the decorative attachments to secure the connector 30 to the eyeglass stem 14. The intent of the Chang patent is to support the eye glasses 10 around a person's neck with the cord 90. No hearing device is inserted through the hole 32h of the connector 30h and the connector 30h is not intended to be used to support a hearing device, however the sound tube (not shown) of a hearing device can be inserted through the hole 32h.

Previously cancelled

FIG. 17 shows the connector 30 as a tubular shape, has a length L rather than just a circular shape. The length L is short depending on the type of hearing device (not shown) and type of eyeglass stem (not shown) is used. The connector 30 is made of a elastomeric material so the connector can stretch when inserting the eyeglass stem (not shown) and the sound tube (not shown) through the hole 32.

FIG. 18 shows another connector 30 as a circular ring, where the edges of the connector 30 also are rounded so as to fit comfortable on a person's ear. The connector 30 is also made of a elastomeric material so the connector can stretch when inserting the eyeglass stem (not shown) and the sound tube (not shown) through the hole 32.

The connector is simple in design as the intent of the connector is hold the hearing device in place using eyeglass stems to keep the hearing device from being misplaced or lost. Hearing devices can fall off of one's ear and are very costly to replace. The connector allows the hearing device to move, but is secure enough by connecting the hearing device to the eyeglass stems.

Eye glass holders are really meant to support eyeglasses from being misplaced. The eye glass holder with their tethered cords keeps the eyeglass from getting lost. The eyeglass holders do have a connector attached to them, however the location of these connectors are really not located in a comfortable location that is compatible to a hearing device. A hearing device can be attached to any of these eye glass holders.

It is to be understood that the aforementioned description is illustrative only and that changes can be made in the connector as well as in other aspects of the invention discussed herein, without departing from the scope of the invention as defined in the following claims.

The invention claimed is:

1. A connector for attaching a hearing device to the eyeglass stem of a person's eyeglasses consisting of:
   said connector having a circular ring shape with a hole and where the wall thickness between the hole and the outer surface of the circular ring shape is circular;
   said connector that is formed using an elastomeric material that has the tensile strength to stretch to alter its shape with minimum elongation change after stretching;
   said connector where the hole of the connector fits over one stem of the eyeglasses that have a pair of lenses that fit within the eyeglass frames and where the eyeglass frames have a frame stem;
   said connector where the same hole of the connector also fits into a hearing device having a housing that receives and transmits sounds to a person's ear and where a part of the hearing device crosses the stem of the eyeglass frames.

2. A connector according to claim 1 where said circular ring shape of said connector can be linear in length and can be cut from a tubular shape.

3. A connector that is part of an assembly of an eyeglass holder where said connector has a hole for an eyeglass stem and a hearing device component to pass through consisting of
   a eyeglass holder that is assembled using a cord that is attached to said connector;
   said connector where the hole of the connector fits over one stem of the eyeglasses that have a pair of lenses that fit within the eyeglass frames and where the eyeglass frames have a frame stem;
   said connector where the same hole of the connector also fits into a hearing device having a housing that receives and transmits sounds to a person's ear and where a part of the hearing device crosses the stem of the eyeglass frames;
   said connector made of an elastomeric material having a shape that allows both the eyeglass stem and hearing device component to pass through the same hole of said connector.

\* \* \* \* \*